March 22, 1949.  J. BOLSEY  2,464,790
ROLL FILM CAMERA WITH COMBINED SHUTTER ARMING
AND FILM TRANSPORTING MECHANISM
Filed Aug. 10, 1944  3 Sheets-Sheet 1
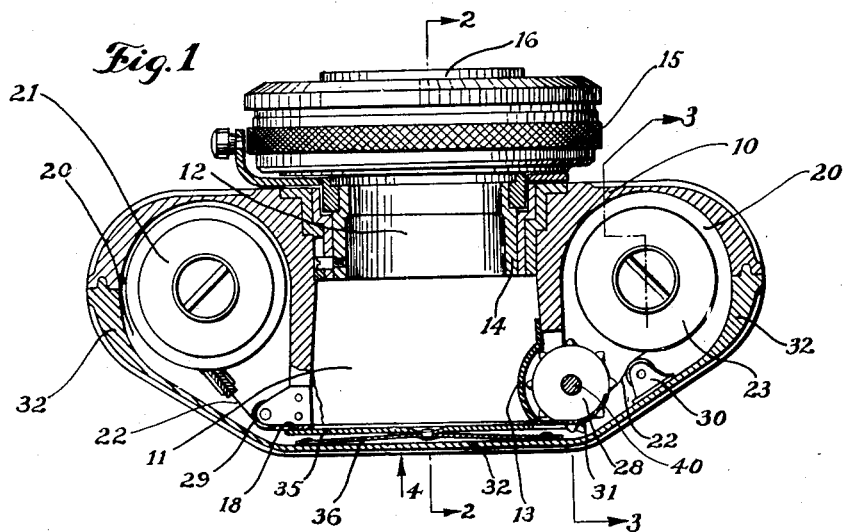
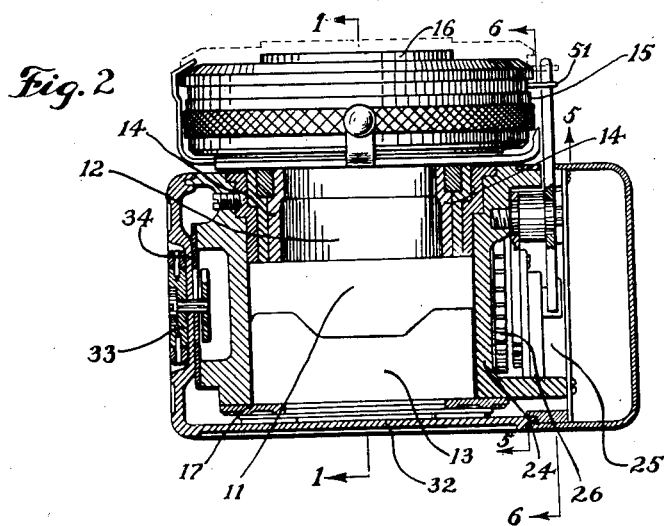
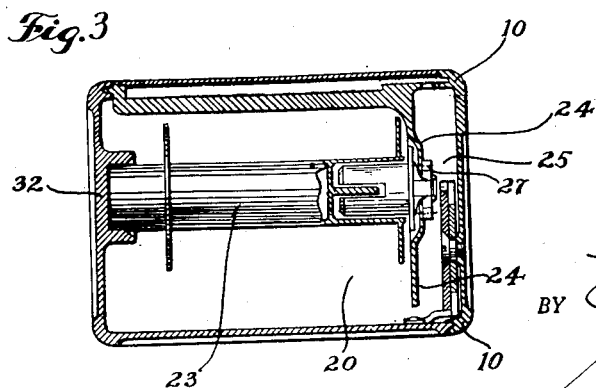
INVENTOR.
Jacques Bolsey
BY March 22, 1949.  J. BOLSEY  2,464,790
ROLL FILM CAMERA WITH COMBINED SHUTTER ARMING
AND FILM TRANSPORTING MECHANISM
Filed Aug. 10, 1944  3 Sheets-Sheet 2

INVENTOR.
Jacques Bolsey
BY
Michael
his Agent

March 22, 1949.  J. BOLSEY  2,464,790
ROLL FILM CAMERA WITH COMBINED SHUTTER ARMING
AND FILM TRANSPORTING MECHANISM
Filed Aug. 10, 1944  3 Sheets-Sheet 3
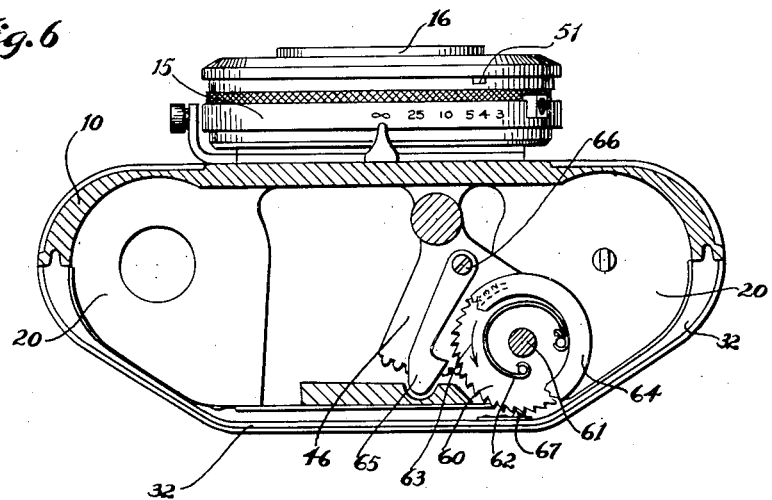
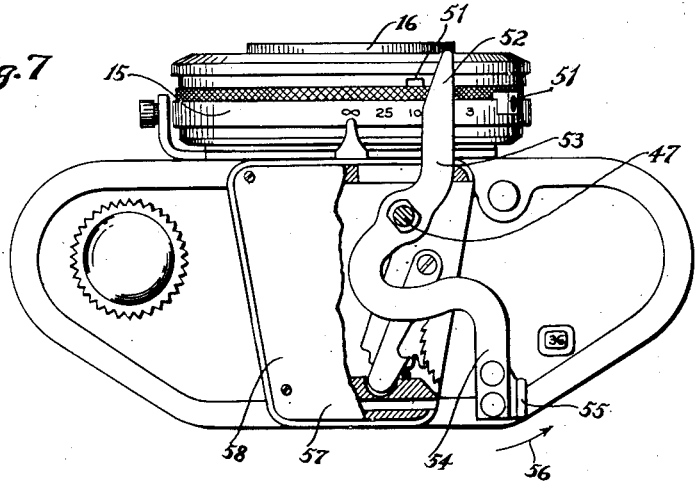
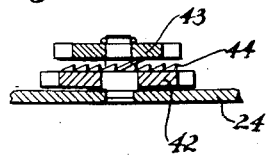
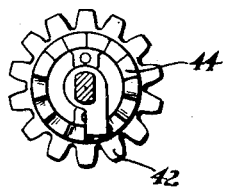
INVENTOR.
Jacques Bolsey
BY Patented Mar. 22, 1949

2,464,790

UNITED STATES PATENT OFFICE 2,464,790

ROLL FILM CAMERA WITH COMBINED SHUTTER ARMING AND FILM TRANSPORTING MECHANISM

Jacques Bolsey, New York, N. Y.

Application August 10, 1944, Serial No. 548,923

9 Claims. (Cl. 95—31)

My present invention relates to photographic cameras and more particularly to photographic cameras provided with lens mounts carrying not only the camera lens but also the shutter mechanism.

It is an object of my present invention to combine a photographic camera provided with a slidable lens and shutter unit with operating means in such a manner as to enable simultaneous arming of the shutter and transportation of the film strip between consecutive exposures.

It is another object of my present invention to provide a camera with operating means for simultaneously arming the shutter and moving the film which means are extremely simple in construction and easy to operate.

It is a further object of my present invention to provide a camera with mechanical operating means for simultaneously arming a shutter combined with a slidable lens mount arranged in the front part of the camera, transporting a film strip along an exposure aperture in the rear part of the camera and actuating an exposure counting mechanism built into the camera body.

It is still a further object of my present invention to provide in combination with my new operating arrangement a counter mechanism of special type which is built partly into the camera cover and partly into the camera body so as to automatically turn the counter into its initial position whenever the camera cover is opened.

With the above objects in view, my present invention mainly consists of a camera comprising in combination a series of elements, namely:

A camera body;

A combined lens and shutter unit including a camera lens and a shutter mechanism, which unit is arranged in the front part of the camera body slidably in direction of the optical axis of the camera lens;

An exposure chamber arranged within the camera body behind the above mentioned slidable combined lens and shutter unit;

Aperture means including an exposure aperture arranged at the rear end of this exposure chamber in the focal plane of the camera lens normal to the optical axis of the same;

Two film compartments for the unexposed and exposed rolls of film arranged in the camera body on opposite sides of the above mentioned exposure chamber;

Film transporting means for moving the film past the aperture opening mentioned above from one of the film compartments into the other; and finally Combined operating means for simultaneously arming the above mentioned shutter mechanism forming part of the slidable combined lens and shutter unit and operating the film transporting means also mentioned above in such a manner as to move the film—each time these combined operating means are actuated—a distance being slightly greater than the length of the aperture opening in direction of the film movement.

The film transporting means mentioned above preferably includes a film transporting sprocket engaging the film for moving the same past the aperture opening from one of the film compartments into the other. Furthermore, it is preferable to rotate not only this film transporting sprocket but also that film spool upon which the exposed film portion is wound up. Of course, in this case it is advisable to provide friction means forming part of the means for rotating this film spool which are adapted to compensate for the variations of the diameter of the wound-up film roll during winding up of the same.

In accordance with a preferred embodiment of my present invention, the combined operating means include a double-armed operating lever secured at its turning point to a turnably arranged actuating member forming part of the film transporting mechanism and adapted to simultaneously turn the film transporting sprocket and the film spool upon which the film is wound up; this operating lever has two lever arms, one of which serves for arming the shutter mechanism forming part of the slidable combined lens and shutter unit mentioned above and the other arm of which serves for turning and thereby actuating this double-armed lever; the pivotal attachment of this lever to the turnably arranged actuating member mentioned above serves for turning this actuating member, thereby rotating the film transporting sprocket and turning the take-up spool upon which the exposed film portion is wound up. Thus, turning of this double-armed lever at its one arm will result in simultaneous arming of the shutter and proper transportation and winding up of the film.

The novel features which I consider characteristic for my invention are set forth in particular in the appended claims. The invention itself, however, both as to its construction and its method of operation, together with additional objects and advantages thereof, will be best understood from the following description of specific embodiments when read in connection with the accompanying drawings in which:

Figure 1 is a longitudinal section through a camera according to my present invention, along line 1—1 of Fig. 2;

Figure 2 is a cross section through the camera shown in Fig. 1, along line 2—2 of that figure;

Figure 3 is another cross section through the camera shown in Fig. 1, along line 3—3 of that figure;

Figure 6 is a cross section through the camera shown in Fig. 2 along line 6—6;

Figure 7 is a top view of the camera partly in section with parts of the view finder removed; and Figures 8 and 9 are a cross section and a top view of the ratchet mechanism forming part of the film transporting arrangement.

Figure 4:
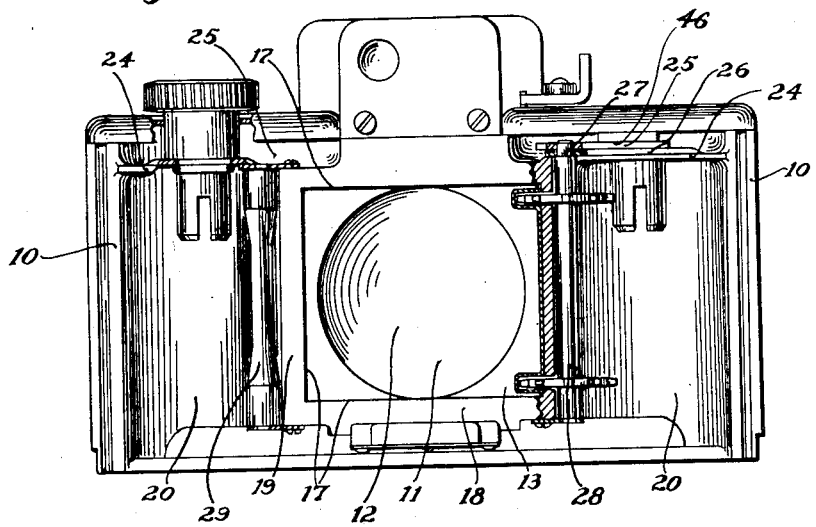
Figure 4 is a rear view of the camera shown in Figs. 1 to 3, seen in direction of arrow 4 on Fig. 1, with the camera cover removed.

My new camera is composed of a camera body 10 provided with a central camera chamber 11 which latter consists of a frontal part 12 which is cylindrical in shape and a rear part 13 having a substantially rectangular cross section.

The frontal cylindrical part 12 of the central camera chamber 11 serves as guiding member for lens mount 14 which latter carries the shutter mechanism 15 and lens 16. Lens mount 14, shutter mechanism 15 and lens 16 are of usual construction and type and will therefore not be described in detail although for the sake of clarity the attached drawings show various details of these parts.

The rear part 13 of the central camera chamber 11 serves as exposure chamber and is provided around its rear edge 17 with an aperture member 18 secured to the camera body and arranged in such a manner that the rear face 19 of this aperture member is located in the focal plane of the camera lens 16 normal to the optical axis of the camera.

On both sides of the central camera chamber 11 film compartments 20 are arranged; these compartments house the film magazine 21 from which the film 22 is unwound and the film spool 23 on which this film is wound up. These film compartments are, as clearly shown in Fig. 3, closed at their top by the dividing wall 24, but open at their bottom.

The dividing wall 24 forms at the top of the camera body a compartment 25 housing the film transporting mechanism 26. This film transporting mechanism is connected by means of small pinions 27 with sprocket 28 arranged, as shown in Fig. 1, partly in the path of the film strip 22 and thereby adapted to transport the same.

The film 22 is guided not only by the aperture surface 19 of the aperture member 18 but also by the guiding rollers 29 and 30; these rollers are arranged in well-known way so as to guide the film on the one hand from the film magazine 21 to the exposure surface 19 and on the other hand from the film sprocket 28 to the film spool 23. The aperture member 18 mentioned above has an extension 31 reaching between the teeth of the sprocket 28; this extension 31 guides the film from the aperture member 18 to the sprocket 28 and into proper engagement with the teeth of this sprocket. Thus, it is evident that during movement of the film from film magazine 21 to film spool 23 the same passes and is guided along the aperture surface 19 of the aperture member 18, ensuring proper distance of the film from lens 16.

The camera cover 32 is, as shown in Fig. 2, L-shaped and covers not only the rear face of the camera but also its bottom, thereby closing also the open bottom ends of the film compartments 20. The lock mechanism 33 engaging in a well-known way a lock plate 34 forming part of the camera body is secured to the cover bottom, enabling light-tight closing of the film compartments and the exposure chamber, whenever required.

A pressure plate 35 is secured by means of a resilient spring 36 to the inner face of the camera cover 32 in such a manner as to press the film 22 against the aperture surface 19 of the aperture member 18 during exposure of the film. This pressure plate 35 forms part of the camera cover 32 and is removed together with the same when the cover is opened, thus enabling easy insertion of the film.

As mentioned above, the film 22 is transported by the film transporting sprocket 28 and wound up on the take-up spool 23. In accordance with my present invention, this film transporting sprocket is carried by shaft 40 which simultaneously also carries pinion 27. This latter pinion engages pinion 42 arranged co-axially with pinion 43 and connected with the same by a ratchet mechanism 44 shown in Figs. 8 and 9; this ratchet mechanism is constructed and arranged in such a manner that when pinion 43 is turned in clockwise direction, indicated by arrow 45 in Fig. 5, the ratchet mechanism will effect turning of pinion 42 in the same direction, while during turning of pinion 43 in counterclockwise direction pinion 42 will not be influenced by such movement but remains at rest.

This pinion 43 is in mesh with gear sector 46 which is rotatably pivoted to shaft 47. Pinion 42 also engages pinion 48 which latter is arranged co-axially with the take-up spool 23 and connected with the same by well-known friction means in such a manner as to turn the take-up spool whenever pinion 42 is rotated. These friction means, not shown in the drawing in detail, will also have the effect of compensating for variations in the diameter of the film roll wound up on spool 23.

Thus, it is evident that turning of gear sector 46 in direction of arrow 49 will result in simultaneous transportation of the film by the film transporting sprocket 28 turned by means of the pinions 27, 42 and 43 and the sprocket mechanism 44, and winding up of the exposed film portion on film spool 23 turned by means of pinions 42, 43, 48, ratchet mechanism 44 and the above mentioned friction means not shown in the drawing in detail.

Figure 5:
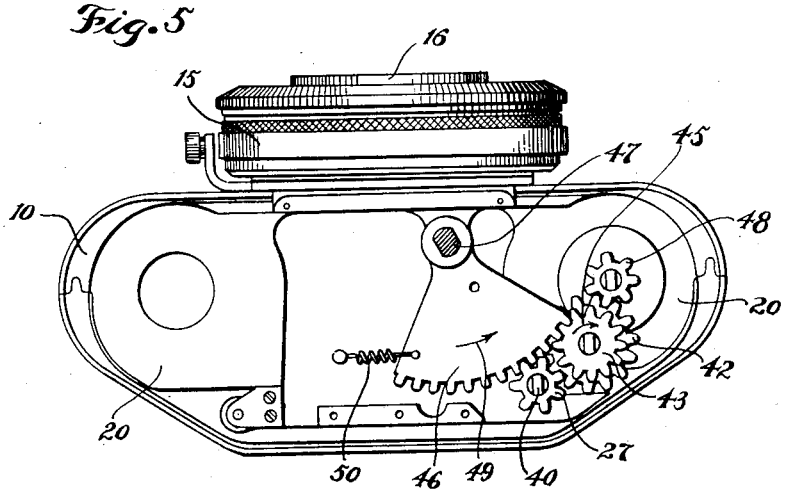
Figure 5 is a cross section through the camera shown in Fig. 2 along line 5—5.

After each film transportation, the gear sector 46 is returned into its initial position shown in Fig. 5 by means of spring 50, turning during such return movement also pinion 43. Such turning movement of pinion 43 is however not transmitted by the ratchet mechanism 44 upon pinion 42 and will thus have no effect upon pinions 27 and 48 and the sprocket 28 and spool 23 respectively, actuated by these pinions.

In order to enable, as proposed above, simultaneous shutter arming and film transportation, the shutter mechanism 15 built into the lens mount 14 is provided with a shutter arming projection 51 engaged by the lever arm 52 of the double-armed actuating lever 53 pivoted to shaft 47 of gear sector 46. The other lever arm 54 of the double-armed lever 53 is provided with button means 55 so as to enable operation of this lever by pushing the same in direction of arrow 56. The central part of the lever is covered by cover 57 of the view finder 58 arranged on top of the camera body 10 and only the end portions of the two lever arms 52 and 54 project through openings in the cover so as to be adapted on the one hand to actuate the shutter arming member 51 and on the other hand to be manually actuated. The rigid connection of the double-armed lever 53 with shaft 47 results in turning movement of gear sector 46 in direction of arrow 49 whenever button 55 at the end of lever arm 54 is turned in direction of arrow 56. Thus, such turning movement of button 55 will result in simultaneous arming of the shutter, transportation of the film and winding up of the transported film on the take-up spool.

As stated above, the lens mount 14 together with the shutter mechanism 15 and the shutter arming projection 51 is slidable in axial direction. The lever arm 52 of the double armed actuating lever 53 is long enough to engage the shutter arming projection in any position of sliding of the lens mount 14 between its position shown in Fig. 2 in full lines and its position shown in the same figure in dotted lines.

In order to enable simultaneously with such shutter arming and film transportation the counting of the exposure, a countermechanism is provided which consists of a toothed plate 60 turnably pivoted by means of screw 61 to camera body 10 and provided with spring means 62 tending to turn this toothed plate 60 in direction of arrow 63. An indicating dial 64 partly shown in Fig. 6 is combined with this toothed plate and visible through an aperture in the camera body so as to indicate the position of this toothed plate and thereby to give an indication of the number of exposures made.

This toothed plate 60 is turned against action of spring 62 by the actuating lever 65 turnably secured by pivoting screw 66 to the gear sector 46 in such a manner as to turn the toothed plate 60 by one tooth clockwise against direction of arrow 63 during each movement of the gear sector 46 in direction of arrow 49. In such turned position, the toothed plate 60 is held against action of spring 62 by the projecting member 67 secured to the camera cover 32, as shown in Fig. 6.

It is evident that while the camera cover is closed, this counting mechanism will function, i. e. during each movement of gear sector 46 the actuating lever 65 will turn the toothed indicating plate 60 by one tooth and the plate will be held in this turned poistion by the projecting member 67 secured to camera cover 32; as soon as the camera cover is opened, the projecting member 61 will also be removed and the toothed plate 60 will be free to turn under action of spring 62 in direction of arrow 63 into its initial position and thus be ready for the next counting cycle.

The mechanism and arrangement described above is thus adapted not only to arm the shutter, transport the film and wind the same up but also to count the exposures made.

It will be understood that each of the elements described above, or two or more together, may also find a useful application in other types of photographic cameras differing from the types described above.

While I have illustrated and described the invention as embodied in photographic cameras provided with slidably combined lens and shutter units, I do not intend to be limited to the details shown, since various modifications and structural changes may be made without departing in any way from the spirit of my invention.

What I claim as new and desire to secure by Letters Patent is:

1. A photographic camera comprising a camera body; a combined lens and shutter unit including a camera lens and a shutter mechanism, said combined lens and shutter unit being arranged in the front part of said camera body slidably in direction of the optical axis of said camera lens; a shutter arming member forming part of said shutter mechanism and included in said combined lens and shutter unit; an exposure chamber arranged within said camera body behind said slidable combined lens and shutter unit; aperture means including an exposure aperture arranged in said camera body at the rear end of said exposure chamber in the focal plane of said camera lens normal to the optical axis of the same; film compartments for the unexposed and exposed rolls of film arranged in said camera body on opposite sides of said exposure chamber; film transporting means for moving said film past said exposure aperture from one of said film compartments into the other, said film transporting means including a turnably arranged actuating member; and a double-armed operating lever fixed at its turning point to said turnably arranged actuating member forming part of said film transporting mechanism; one lever arm of said double-armed lever directly engaging said shutter arming member forming part of said slidable combined lens and shutter unit in every possible position of sliding of the same, said fixing of said double-armed operating lever to said turnably arranged actuating member enabling turning of said actuating member, by said double-armed lever and said other lever arm of said double-armed lever serving for turning said double-armed lever, thereby simultaneously arming said shutter mechanism forming part of said slidable combined lens and shutter unit and operating said film transporting means in such a manner as to move said film a distance being slightly greater than the length of said exposure aperture in direction of the film movement each time said combined operating means are actuated.

2. A photographic camera comprising a camera body; a combined lens and shutter unit including a camera lens and a shutter mechanism, said combined lens and shutter unit being arranged in the front part of said camera body slidably in direction of the optical axis of said camera lens; a shutter arming member forming part of said shutter mechanism and included in said combined lens and shutter unit; an exposure chamber arranged within said camera body behind said slidable combined lens and shutter unit; aperture means including an exposure aperture arranged in said camera body at the rear end of said exposure chamber in the focal plane of said camera lens normal to the optical axis of the same; film compartments for the unexposed and exposed rolls of film arranged in said camera body on opposite sides of said exposure chamber; film transporting means for moving said film past said exposure aperture from one of said film compartments into the other, said film transporting means including a film transporting sprocket engaging said film for moving the same past said exposure aperture from one of said film compartments into the other and a turnably arranged actuating member for turning said film transporting sprocket; and a double-armed operating lever secured at its turning point to said turnably arranged actuating member forming part of said film transporting mechanism, one lever arm of said double-armed lever directly engaging said shutter arming member forming part of said slidable combined lens and shutter unit in every possible sliding position of the same, said fixing of said double-armed operating lever to said turnably arranged actuating member enabling turning of said actuating member and the film transporting sprocket actuated by the same, and said other lever arm of said double-armed lever serving for turning said double-armed lever, thereby simultaneously arming said shutter mechanism forming part of said slidable combined lens and shutter unit and operating said film transporting means in such a manner as to move said film a distance being slightly greater than the length of said exposure aperture in direction of the film movement each time said combined operating means are actuated.

3. A photographic camera comprising a camera body; a combined lens and shutter unit including a camera lens and a shutter mechanism, said combined lens and shutter unit being arranged in the front part of said camera body slidably in direction of the optical axis of said camera lens; a shutter arming member forming part of said shutter mechanism and included in said combined lens and shutter unit; an exposure chamber arranged within said camera body behind said slidable combined lens and shutter unit; aperture means including an exposure aperture arranged in said camera body at the rear end of said exposure chamber in the focal plane of said camera lens normal to the optical axis of the same; film compartments for the spools carrying the unexposed and exposed portions of the film arranged in said camera body on opposite sides of said exposure chamber; film transporting means for moving said film past said exposure aperture from the film spool carrying said unexposed film portion to the film spool carrying the exposed film portion, said film transporting means including a film transporting sprocket engaging said film for moving the same past said exposure aperture from said spool carrying the unexposed film portion to said spool carrying the exposed film portion and a turnably arranged actuating member for turning said film transporting sprocket; means for rotating said film spool carrying said exposed film portion; and a double-armed lever secured at its turning point to said turnably arranged actuating member forming part of said film transporting mechanism, one lever arm of said double-armed lever directly engaging said shutter arming member forming part of said slidable combined lens and shutter unit during sliding of the same, said fixing of said double-armed operating lever to said turnably arranged actuating member serving for turning said actuating member and the film transporting sprocket and said rotating means for said film spool actuated by the same, and said other lever arm of said double-armed lever serving for turning said double-armed lever, thereby simultaneously arming said shutter mechanism forming part of said slidable combined lens and shutter unit, operating said film transporting means in such a manner as to move said film a distance being slightly greater than the lenth of said exposure aperture in direction of the film movement each time said combined operating means are actuated, and winding up the exposed film portion on said spool for said exposed film portion.

4. A photographic camera comprising a camera body; a combined lens and shutter unit including a camera lens and a shutter mechanism, said combined lens and shutter unit being arranged in the front part of said camera body slidably in direction of the optical axis of said camera lens; a shutter arming member forming part of said shutter mechanism and included in said combined lens and shutter unit; an exposure chamber arranged within said camera body behind said slidable combined lens and shutter unit; aperture means including an exposure aperture arranged in said camera body at the rear end of said exposure chamber in the focal plane of said camera lens normal to the optical axis of the same; film compartments for the unexposed and exposed rolls of film arranged in said camera body on opposite sides of said exposure chamber; film transporting means for moving said film past said exposure aperture from one of said film compartments into the other, said film transporting means including a film transporting sprocket engaging said film for moving the same past said exposure aperture from one of said film compartments into the other and a turnably arranged actuating member for turning said film transporting sprocket; means for rotating said film spool carrying said exposed film portion; friction means forming part of said means for rotating said film spool and adapted to compensate for the variations of the diameter of the wound-up film roll during winding up of the same; and a double-armed lever secured at its turning point to said turnably arranged actuating member forming part of said film transporting mechanism, one lever arm of said double-armed lever directly engaging said shutter arming member forming part of said slidable combined lens and shutter unit during sliding of the same, said pivotal attachment of said double-armed operating lever to said turnably arranged actuating member serving for turning said actuating member and the film transporting sprocket and said rotating means for said film spool actuated by the same, and said other lever arm of said double-armed lever serving for turning said double-armed lever, thereby simultaneously arming said shutter mechanism forming part of said slidable combined lens and shutter unit, operating said film transporting means in such a manner as to move said film a distance being slightly greater than the length of said exposure aperture in direction of the film movement each time said combined operating means are actuated, and winding up the exposed film portion on said spool for said exposed film portion.

5. A photographic camera comprising a camera body; a slidable combined lens and shutter unit including a slidable camera lens and a slidable shutter mechanism, said slidable combined lens and shutter unit being arranged in the front part of said camera body slidably in direction of the optical axis of said camera lens; a shutter arming member forming part of said shutter mechanism and included in said combined lens and shutter unit; an exposure chamber arranged within said camera body behind said slidable combined lens and shutter unit; aperture means including an exposure aperture arranged in said camera body at the rear end of said exposure chamber in the focal plane of said slidable camera lens normal to the optical axis of the same; film compartments for the unexposed and exposed rolls of film arranged in said camera body on opposite sides of said exposure chamber; film transporting means for moving said film past said exposure aperture from one of said film compartments into the other, said film transporting means including a turnably arranged gear sector; a double-armed operating lever secured at its turning point to said turnably arranged gear sector forming part of said film transporting mechanism, one lever arm of said double-armed lever directly engaging said shutter arming member forming part of said slidable combined lens and shutter unit, said firm attachment of said double-armed operating lever to said turnably arranged gear sector serving for turning said gear sector, and said other lever arm of said double-armed lever serving for turning said double-armed lever, thereby simultaneously arming said shutter mechanism forming part of said slidable combined lens and shutter unit and operating said film transporting means in such a manner as to move said film a distance being slightly greater than the length of said exposure aperture in direction of the film movement each time said combined operating means are actuated.

6. A photographic camera comprising a camera body; a slidable combined lens and shutter unit including a slidable camera lens and a slidable shutter mechanism, said slidable combined lens and shutter unit being arranged in the front part of said camera body slidably in direction of the optical axis of said camera lens; a shutter arming member forming part of said shutter mechanism and included in said combined lens and shutter unit; an exposure chamber arranged within said camera body behind said slidable combined lens and shutter unit; aperture means including an exposure aperture arranged in said camera body at the rear end of said exposure chamber in the focal plane of said slidable camera lens normal to the optical axis of the same; film compartments for the spools carrying the unexposed and exposed portions of the film arranged in said camera body on opposite sides of said exposure chamber; film transporting means for moving said film past said exposure aperture from the film spool carrying said unexposed film portion to the film spool carrying the exposed film portion, said film transporting means including a film transporting sprocket engaging said film for moving the same past said exposure aperture from said spool carrying the unexposed film portion to said spool carrying the exposed film portion and a turnably arranged gear sector for turning said film transporting sprocket; means for rotating said film spool carrying said exposed film portion; and a double-armed lever firmly secured at its turning point to said turnably arranged gear sector forming part of said film transporting mechanism, one lever arm of said double-armed lever directly engaging said shutter arming member forming part of said slidable combined lens and shutter unit during sliding of the same, said firm fixing of said double-armed operating lever to said turnably arranged gear sector serving for turning said gear sector and the film transporting sprocket and said rotating means for said film spool actuated by the same, and said other lever arm of said double-armed lever serving for turning said double-armed lever, thereby simultaneously arming said shutter mechanism forming part of said slidable combined lens and shutter unit, operating said film transporting means in such a manner as to move said film a distance being slightly greater than the length of said exposure aperture in direction of the film movement each time said combined operating means are actuated, and winding up the exposed film portion on said spool for said exposed film portion.

7. In a photographic camera of the type claimed in claim 1, a counter mechanism actuated by said double-armed actuating lever combined operating means, said counter mechanism being partly secured to said camera body and partly to the camera cover in such a manner as to automatically return to its initial position whenever the camera cover is opened.

8. In combination with a photographic camera of the type claimed in claim 1, spring means for returning said double-armed actuating lever into its initial position each time it has been manually actuated.

9. In combination with a photographic camera of the type claimed in claim 2, ratchet means provided in the connection between said turnably arranged actuating member and said film transporting sprocket so as to enable turning of said sprocket in direction of movement of said film only, and spring means for returning said double-armed actuating lever into its initial position without any influence on said film transporting sprocket each time said double-armed actuating lever has been manually actuated.

JACQUES BOLSEY.

REFERENCES CITED

The following references are of record in the file of this patent:

UNITED STATES PATENTS

| Number | Name | Date |
| --- | --- | --- |
| 2,040,018 | Kilfitt | May 5, 1936 |
| 2,150,642 | Wachtler | Mar. 14, 1939 |
| 2,180,028 | Wittel | Nov. 14, 1939 |
| 2,231,731 | Mihalyi | Feb. 11, 1941 |
| 2,233,006 | Goldhammer | Feb. 25, 1941 |
| 2,245,213 | Mihalyi | June 10, 1941 |
| 2,246,034 | Elison | June 17, 1941 |
| 2,301,956 | Kuppenbender et al. | Nov. 17, 1942 |
| 2,304,887 | Crumrine | Dec. 15, 1942 |
| 2,309,382 | Cazin | Jan. 26, 1943 |
| 2,335,439 | Nerwin et al. | Nov. 30, 1943 |

FOREIGN PATENTS

| Number | Country | Date |
| --- | --- | --- |
| 504,499 | Great Britain | May 4, 1938 |